(12) United States Patent
Bantivoglio, III

(10) Patent No.: US 11,593,326 B2
(45) Date of Patent: Feb. 28, 2023

(54) METHOD AND SYSTEM FOR MANAGING METADATA

(71) Applicant: GiantChair, Inc., Washington, DC (US)

(72) Inventor: John Bantivoglio, III, Washington, DC (US)

(73) Assignee: GiantChair, Inc., Washington, DC (US)

( * ) Notice: Subject to any disclaimer, the term of this patent is extended or adjusted under 35 U.S.C. 154(b) by 0 days.

(21) Appl. No.: 14/048,280

(22) Filed: Oct. 8, 2013

(65) Prior Publication Data
US 2014/0101112 A1 Apr. 10, 2014

Related U.S. Application Data

(60) Provisional application No. 61/710,882, filed on Oct. 8, 2012.

(51) Int. Cl.
*G06F 16/215* (2019.01)

(52) U.S. Cl.
CPC ................... *G06F 16/215* (2019.01)

(58) Field of Classification Search
CPC .................. G06F 17/30303; G06F 16/215
USPC ......................................................... 707/691
See application file for complete search history.

(56) References Cited

U.S. PATENT DOCUMENTS

| | | | | |
|---|---|---|---|---|
| 6,515,968 B1* | 2/2003 | Combar | ............... | G06F 11/0709 370/252 |
| 6,615,258 B1* | 9/2003 | Barry | .................. | G06F 11/0709 709/223 |
| 6,714,979 B1* | 3/2004 | Brandt | .................. | H04L 63/166 709/225 |
| 6,760,721 B1* | 7/2004 | Chasen | .................... | G06F 16/48 |
| 7,620,725 B2 | 11/2009 | King et al. | ..................... | 709/229 |
| 7,680,759 B1* | 3/2010 | Coley | ..................... | G06F 16/24 707/999.001 |
| 7,899,783 B1 | 3/2011 | Xu et al. | ....................... | 707/613 |
| 8,458,232 B1* | 6/2013 | Spertus | .................. | G06F 16/16 707/831 |
| 2002/0188622 A1* | 12/2002 | Wallen | .................... | G06Q 50/04 |
| 2004/0111728 A1* | 6/2004 | Schwalm | ................ | H04L 29/06 719/316 |
| 2004/0123109 A1* | 6/2004 | Choi | ..................... | H04L 9/3239 713/176 |
| 2004/0153968 A1* | 8/2004 | Ching | .................... | G06F 40/117 715/235 |
| 2005/0022114 A1* | 1/2005 | Shanahan | ............... | G06F 21/10 715/234 |
| 2005/0278270 A1* | 12/2005 | Carr | ....................... | G06Q 10/10 706/25 |
| 2007/0088710 A1* | 4/2007 | Song et al. | ..................... | 707/10 |
| 2007/0174310 A1* | 7/2007 | Arrouye | ................ | G06F 16/134 |

(Continued)

FOREIGN PATENT DOCUMENTS

CN 100547594 C 10/2009

OTHER PUBLICATIONS

Liolios et al. "The Metadata Coverage Index (MCI): A Standardized Metric for Quantifying Database Metadata Richnes" Standards in Genomic Sciences 2012 6:444-453.

(Continued)

*Primary Examiner* — Hicham Skhoun

(57) ABSTRACT

A computer-based method and scoring system for management of metadata is provided.

26 Claims, 18 Drawing Sheets

(56) References Cited

U.S. PATENT DOCUMENTS

| | | | | |
|---|---|---|---|---|
| 2007/0260584 A1* | 11/2007 | Marti | ............... | G06F 16/258 |
| 2007/0292012 A1* | 12/2007 | Brandon | ............... | G06F 19/321 |
| | | | | 382/128 |
| 2007/0299806 A1* | 12/2007 | Bardsley | ............... | G06F 17/30115 |
| 2008/0052112 A1* | 2/2008 | Zahlmann | ............... | G06F 19/321 |
| | | | | 705/2 |
| 2008/0140602 A1* | 6/2008 | Roth | ............... | G06F 16/215 |
| | | | | 706/59 |
| 2008/0201299 A1* | 8/2008 | Lehikoinen | ............... | G06F 16/48 |
| 2008/0307262 A1* | 12/2008 | Carlin, III | ............... | G06F 16/254 |
| | | | | 714/37 |
| 2009/0031216 A1 | 1/2009 | Dressel et al. | ............... | 715/255 |
| 2009/0106242 A1* | 4/2009 | McGrew | ............... | G06F 16/2365 |
| 2009/0171991 A1* | 7/2009 | Gitai | ............... | G06F 16/211 |
| 2009/0182739 A1* | 7/2009 | Crockett | ............... | G06Q 10/10 |
| | | | | 715/764 |
| 2009/0228777 A1* | 9/2009 | Henry | ............... | G06F 16/40 |
| | | | | 707/999.005 |
| 2009/0234826 A1* | 9/2009 | Bidlack | ............... | G06F 16/215 |
| 2010/0106559 A1* | 4/2010 | Li | ............... | G06Q 30/00 |
| | | | | 705/317 |
| 2010/0145257 A1* | 6/2010 | Nitzan | ............... | A61N 1/30 |
| | | | | 604/20 |
| 2010/0180349 A1* | 7/2010 | Koohgoli | ............... | G06F 21/10 |
| | | | | 726/30 |
| 2010/0211575 A1* | 8/2010 | Collins | ............... | G06F 16/489 |
| | | | | 707/E17.143 |
| 2010/0262577 A1* | 10/2010 | Pulfer | ............... | G06F 21/6209 |
| | | | | 707/E17.008 |
| 2010/0268544 A1* | 10/2010 | Nitahara et al. | ............... | 705/2 |
| 2011/0145257 A1 | 6/2011 | McDonald et al. | ............... | 707/743 |
| 2011/0225139 A1* | 9/2011 | Wang | ............... | G06F 16/9535 |
| | | | | 707/711 |
| 2011/0258232 A1* | 10/2011 | Scriffignano | ............... | G06F 17/30448 |
| | | | | 707/780 |
| 2011/0270847 A1 | 11/2011 | Etkin | ............... | 707/748 |
| 2012/0102002 A1* | 4/2012 | Sathyanarayana | ............... | G06F 16/215 |
| | | | | 707/687 |
| 2012/0246170 A1* | 9/2012 | Iantorno | ............... | G06F 11/3672 |
| | | | | 707/748 |
| 2012/0310850 A1* | 12/2012 | Zeng et al. | ............... | 705/317 |
| 2012/0311426 A1* | 12/2012 | Desai | ............... | G06F 40/205 |
| | | | | 715/243 |
| 2013/0054548 A1* | 2/2013 | Fosback | ............... | G06F 16/83 |
| | | | | 707/694 |
| 2013/0073574 A1* | 3/2013 | Jin et al. | ............... | 707/756 |
| 2013/0097164 A1* | 4/2013 | Welinder et al. | ............... | 707/736 |
| 2013/0166552 A1* | 6/2013 | Rozenwald | ............... | G06F 16/215 |
| | | | | 707/737 |
| 2013/0232157 A1* | 9/2013 | Kamel | ............... | G06F 16/215 |
| | | | | 707/755 |
| 2013/0263184 A1* | 10/2013 | Melnychenko | ............... | H04N 21/482 |
| | | | | 725/50 |
| 2013/0290238 A1* | 10/2013 | Griffith | ............... | G06N 5/025 |
| | | | | 706/47 |
| 2014/0071138 A1* | 3/2014 | Gibson | ............... | G06T 11/206 |
| | | | | 345/501 |
| 2014/0101112 A1* | 4/2014 | Bantivoglio, III | ............... | G06F 16/215 |
| | | | | 707/691 |

OTHER PUBLICATIONS

International Search Report from PCT/US13/63784, dated Apr. 22, 2014, PCT.
Alloway et al. "Metadata for Digital Libraries: a Research Agenda" EU-NSF Working Group on Metadata 2011 <http://www.ercim/eu/publication/ws-proceedings/EU-NSF/metadata.html>.
O'Leary, B. "Development, Use, and Modification of Book Product Metadata Assessment and Recommendations" Magellan Media Consulting New York, NY: Book Industry Study Group, Inc. 2012.
International Preliminary Report on Patentability from PCT/US2013/063784 dated Apr. 16, 2015.
Extended European Search Report in EP Application No. 13845630.6 dated Apr. 29, 2016.
Anonymous: Did you know you can automate metadata validation (Part I)?: ArcGIS blog Nov. 29, 2011.
Anonymous: Did you know you can automate metadata validation (Part II)?: ArcGIS blog Dec. 7, 2011.

* cited by examiner onixsuite

So & So Publishing

Search | go

Score | Catalog | Contributors | Web Sales | Events | Partners | Page Content | Newsletters | Settings Scorecards | Filters | Lists Search titles in this scorecard | go Onixsuite Best Practices Scorecard Errors   Warnings   Tips & Suggestions

TOTAL SCORE
72

ISBN / EAN > Title is missing a product identifier type code value          1-20 of 876   View All

| ☐ | Title ▼ | Date ▼ | Author ▼ | Errors on title ▼ | Title Score ▼ |
|---|---|---|---|---|---|
| ☐ | DESCRIBING A CIRCLE | 2012 | Uhl Jansson | 13 | 82 |
| ☐ | The Ceremony of Innocence | 2012 | Jan Holver | 17 | 70 |
| ☐ | Heavy Clouds | 2011 | Asa Nederlander | 34 | 67 |
| ☐ | Voice of the Xlabay | 2011 | Samuel Lewes | 53 | 65 |
| ☐ | River Islands | 2011 | Ella Goldman | 12 | 90 |
| ☐ | The Chamelhouse | 2011 | Katherine Fawcett | 27 | 81 |
| ☐ | Blue Mondays | 2006 | John F. Mollie | 72 | 52 |
| ☐ | DESCRIBING A CIRCLE | 2012 | Uhl Jansson | 13 | 82 |
| ☐ | The Ceremony of Innocence | 2012 | Jan Holver | 17 | 70 |
| ☐ | Heavy Clouds | 2011 | Asa Nederlander | 34 | 67 |
| ☐ | Voice of the Xlabay | 2011 | Samuel Lewes | 53 | 65 |
| ☐ | River Islands | 2011 | Ella Goldman | 12 | 90 |
| ☐ | The Chamelhouse | 2011 | Katherine Fawcett | 27 | 81 |
| ☐ | Blue Mondays | 2006 | John F. Mollie | 72 | 52 |

1-20 of 876   View All

Figure 2A onixsuite

So & So Publishing      [Search] [go]

| Score | Catalog | Contributors | Web Sales | Events | Partners | Page Content | Newsletters | Settings |

[Scorecards] [Fillers] [Lists]     Search titles in this scorecard [go]

Onixsuite Best Practices Scorecard      TOTAL SCORE

Errors   Warnings   Tips & Suggestions     72

3547 Errors on 876 titles     View by Priority | View by Field

▼ High Priority Errors (2140)

| Name | Issues in this field | Titles affected | Errors | Percent of score |
|---|---|---|---|---|
| ▼ ISBN and EAN | 4 | 454 | 980 | 8% |
|     Format ISBN or EAN is not correct | | 116 | 450 | 2% |
|     Title is missing a product identifier type code value | | 75 | 109 | 2% |
|     Title is missing a product identifier type code | | 115 | 350 | 2% |
|     Format is missing an ISBN 13 or a GTN 13 | | 115 | 150 | 2% |
| ▶ Publisher/Vendor of Record | 2 | 148 | 389 | 8% |
| ▶ Subject Codes | 3 | 837 | 838 | 8% |
| ▶ Weight & Dimensions | 1 | 483 | 832 | 8% |

▶ Medium Priority Errors (940)

▶ Low Priority Errors (670)

Figure 2C

| ○ ▽ Medium Priority Error (183) | | |
| --- | --- | --- |
| Name | Issues in this field | Titles affected | Errors |
| ▷ Return code | 2 | 18 | 22 |
| ▷ Subject Code(s) | 1 | 8 | 11 |
| ▽ Age range of target audience | 1 | 1 | 1 |
|    Titles for children or young adults must give an age indication | | 1 | 1 |
| ▷ Bar code indicator | 1 | 8 | 10 |
| ▷ Distributor/vendor of record | 1 | 2 | 2 |
| ▷ Case pack / carton quantity | 1 | 17 | 20 |
| ▷ Page count, running time, and extent | 1 | 5 | 5 |
| ▷ Strict-on-sale date | 2 | 7 | 9 |
| ▷ Textual description of product | 2 | 8 | 12 |
| ▷ Publisher's proprietary discount code | 1 | 19 | 33 |
| ▷ Weight and dimensions | 1 | 16 | 18 |
| ▷ Territorial rights | 1 | 17 | 31 |
| ▷ Digital image of product | 1 | 6 | 8 |
| ▷ Number of pieces (if >1) | 1 | 1 | 1 |

○ ▷ Low Priority Errors (22)

Figure 5A

Long Description

All Information
- Title: Eagle of the Ninth
- Edition:
- Series:
- Language: English
- Publisher: Oxford University Press
- Onix Audience: 02 Children/juvenile
- BISAC Subject Heading:
- First Published:
- Format: Paperback
- Publishing Status:
- Nb of pages:
- ISBN-13:
- GTIN13(EAN13):
- Publication Date:
- Nb of pages:
- Dimensions:
- Weight:
- List Price:
- Strict Onsale Date:
- Sales Rights:
- Return Code:
- Discount Code:
- Barcode Indicator:

Figure 5B

All Information

| Field | Value |
|---|---|
| Title: | Eagle of the Ninth |
| Edition: | |
| Series: | |
| Language: | English |
| Publisher: | Oxford University Press |
| School Level: | 9 Ninth Grade |
| | 10 Tenth Grade |
| | 11 Eleventh Grade |
| Onix Audience: | 02 Children/juvenile |
| BISAC Subject Heading: | |
| First Published: | |
| Format: | Paperback |
| Publishing Status: | |
| Nb of pages: | |
| ISBN-13: | |
| GTIN13(EAN13): | |
| Publication Date: | |
| Nb of pages: | |
| Dimensions: | |
| Weight: | |
| List Price: | |

Figure 5C

Audience Codes*

Link to the industry standards for audience and schools, used in Onix.

You must at least associate your title with one of the Onix audience codes.

You can also use the other industry standard codes to give more audience detail. (eg BISAC or BIC codes).

Obligatory field.

Create Links to [ School Levels ] [ Target Audience Codes ] [ Standard Audience Codes ]

Interest Age  from [ 8 ] to [ 12 ] years ◆

Reading Age  exactly [  ] years ◆

Other library classification code [  ]

Library of Congress Control Number [  ]

METHOD AND SYSTEM FOR MANAGING METADATA

This patent application claims the benefit of priority from U.S. Provisional Application Ser. No. 61/710,882, filed Oct. 8, 2012, the teachings of which are herein incorporated by reference in their entirety.

FIELD OF THE INVENTION

The present invention provides a computer-based method for the management of metadata wherein metadata is entered, scored by comparison to one or more standards or rules and a report of errors, warnings and recommendations is produced. The computer based method further provides a means for correction and/or editing and improvement of the metadata, as well as, the distribution of the improved metadata. Also provided by the present invention is a scoring system for the quality of the metadata.

BACKGROUND OF THE INVENTION

Metadata or metacontent provides information about one or more aspects of data including, but not limited to, means of creation of the data, purpose of the data, time and date of creation, creator or author of data, and standards used.

Many organizations such as the American National Standards Institute (ANSI) and the International Organization for Standardization (ISO, the Book Industry Study Group (BISG), EDiTEUR (define) have established extensive detailed rules and/or standards for metadata and registries in various disciplines. These standards often regulate .xml standard computer code that is used for the sharing of catalogue information between parties in fields where correct standardized catalogs are important, such as books, art, images, music and film.

Managers of such catalogs attempt to keep hundreds, thousands, and sometimes hundreds of thousands of individual records complete, of the highest quality, as determined, for example, by searchability, relevance and richness, and in compliance with such standards.

Computer-based methods exist for evaluating and/or verifying whether or not necessary tags of a file containing .xml metadata are completed, or are in the correct order or have the right codes for specific tags.

However, evaluating whether or not the provided metadata in the fields meets the established rules and/or standards and/or best practices for the selected discipline with respect to accuracy and/or format and/or quality, and/or relevance and/or completeness requires review by a human with advanced expertise in the rules and/or standards and/or best practices and/or quality of metadata for the selected discipline. Such human review is extremely time-consuming and laborious and is often inaccurate. Further, it is not possible for a human or a group of humans to maintain the huge number of records in these catalogs, often kept in different places and/or databases, in conformance with very nuanced and specific industry standards and/or other qualitative standards. Currently, such review is performed by random selection of catalogue entries for human review. This method provides neither an accurate representation of the quality of the metadata nor a cost-effective means for those who need to maintain accuracy and consistency within large catalogs.

SUMMARY OF THE INVENTION

An aspect of the present invention relates to a computer-based method for managing metadata. In this method, metadata for a selected discipline is uploaded to a computer processor. The metadata file is first checked via the computer for completion of the necessary fields. The uploaded metadata is then compared via the computer to one or more selected rules, standards and/or best practices for the selected discipline for accuracy and/or format and/or completeness and/or quality and a breakdown of errors and/or warnings from these comparisons is provided. Errors identified in these comparison steps by the computer are inclusive of missing fields in the data file as well as errors in metadata previously only identified visually by experts with years of experience in the rules and/or standards and/or best practices regarding metadata for that selected discipline. A means to correct and/or edit and/or enhance and/or improve the metadata is then provided.

In one embodiment, one or more scores are assigned to the metadata based upon completion of the necessary fields, the comparison of the entered metadata to the selected one or more rules, standards and/or best practices of the selected discipline and/or the quality of the metadata.

Accordingly, another aspect of the present invention relates to a scoring system for metadata by which users and/or consumers of such data can assess accuracy and/or reliability and/or completeness and/or richness and/or quality of the metadata. In this system, a computer processor is provided for entry of the metadata file for a selected discipline. A means is provided for checking the metadata file for completion of the necessary fields. A means is also provided for comparison of the metadata to one or more selected rules, standards and/or best practices for the selected discipline. Errors identified by this comparison means are inclusive of errors in metadata identified previously only by visual inspection by experts with years of experience in the rules and/or standards and/or best practices and/or quality regarding metadata for that selected discipline. A score card is generated and one or more scores indicative of the quality and/or accuracy and/or completeness and/or richness of the metadata is assigned to the metadata based upon the comparisons.

BRIEF DESCRIPTION OF THE FIGURES

FIGS. 2A through 2C are examples of scorecards generated with the methods and scoring system of the present invention.

Figure 5E:
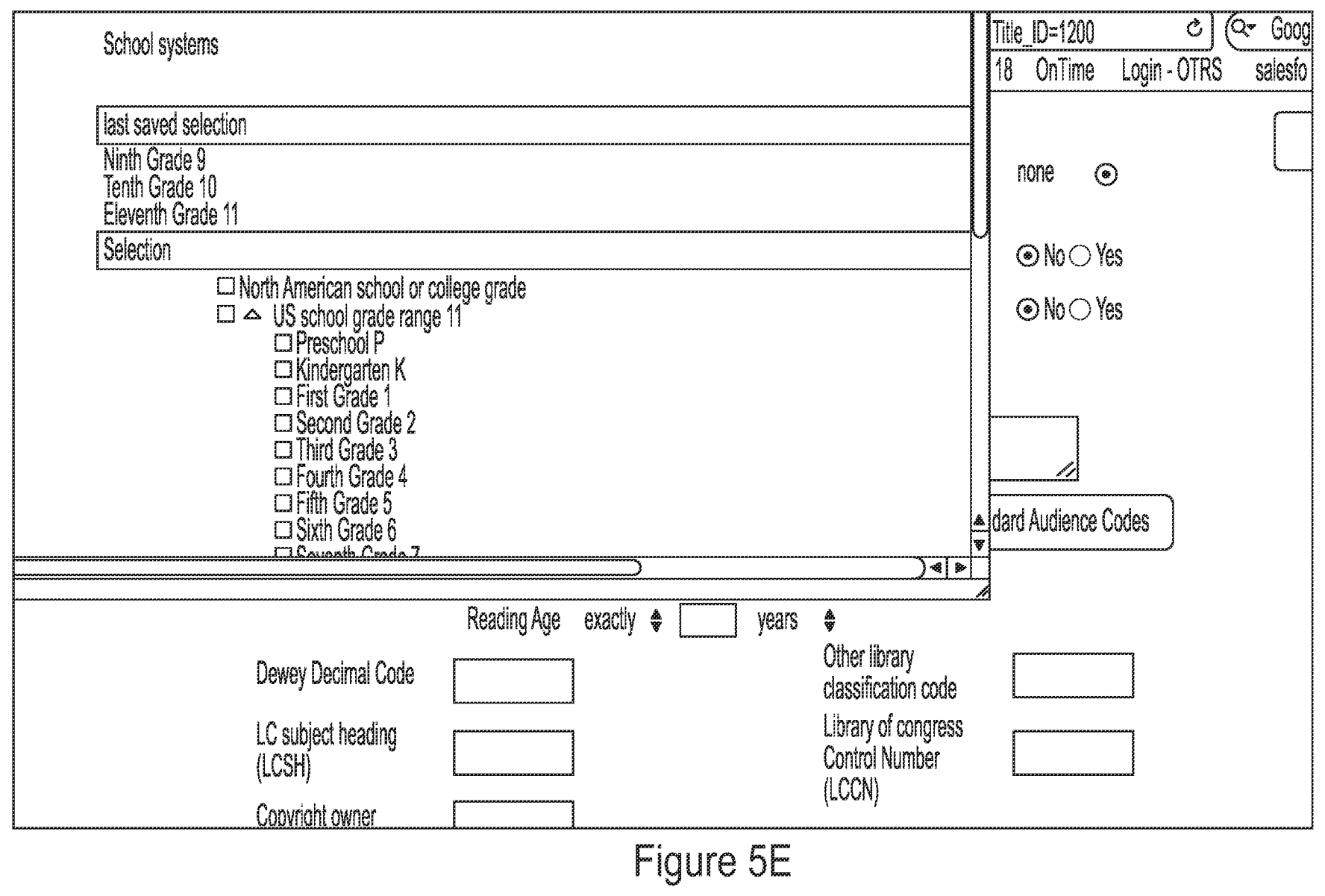

FIGS. 5A though 5E are screen shots from the method of the present invention exemplifying the process of identifying and correcting an error in the metadata. FIG. 5A is a screen shot of a list of rules bit followed and indicates that there is a title that is missing the necessary age qualification. FIG. 5B is a screen shot showing the book page of the title with an issue. In this example, this title has several issues and all are highlighted. FIG. 5C is a screen shot showing the book page following correction where the title has had the U.S. School Grades added. FIG. 5D is a screen shot showing the data manager system where the necessary information can be added and FIG. 5E is a screen shot showing the data manager adding the school grades.

DETAILED DESCRIPTION OF THE INVENTION

The present invention provides a computer-based method for management of metadata as well as a scoring system for metadata. With the method of the present invention, a metadata file for a selected discipline can be uploaded, evaluated, scored, corrected, and maintained.

In one embodiment, the computer-based method is provided with a user-friendly cloud-based environment accessible via any web browser. Alternatively, the computer based method may be hosted on a user's own network. The method of the present invention can perform on a single-user platform or a multi-user platform enabling multiple users to evaluate and correct, maintain and/or enhance metadata from a website collaboratively.

Examples of the various selected disciplines for which metadata can be managed in accordance with the present invention include, but are not limited to, metadata for books, images, film, music, art, and cultural collections.

Figure 1:
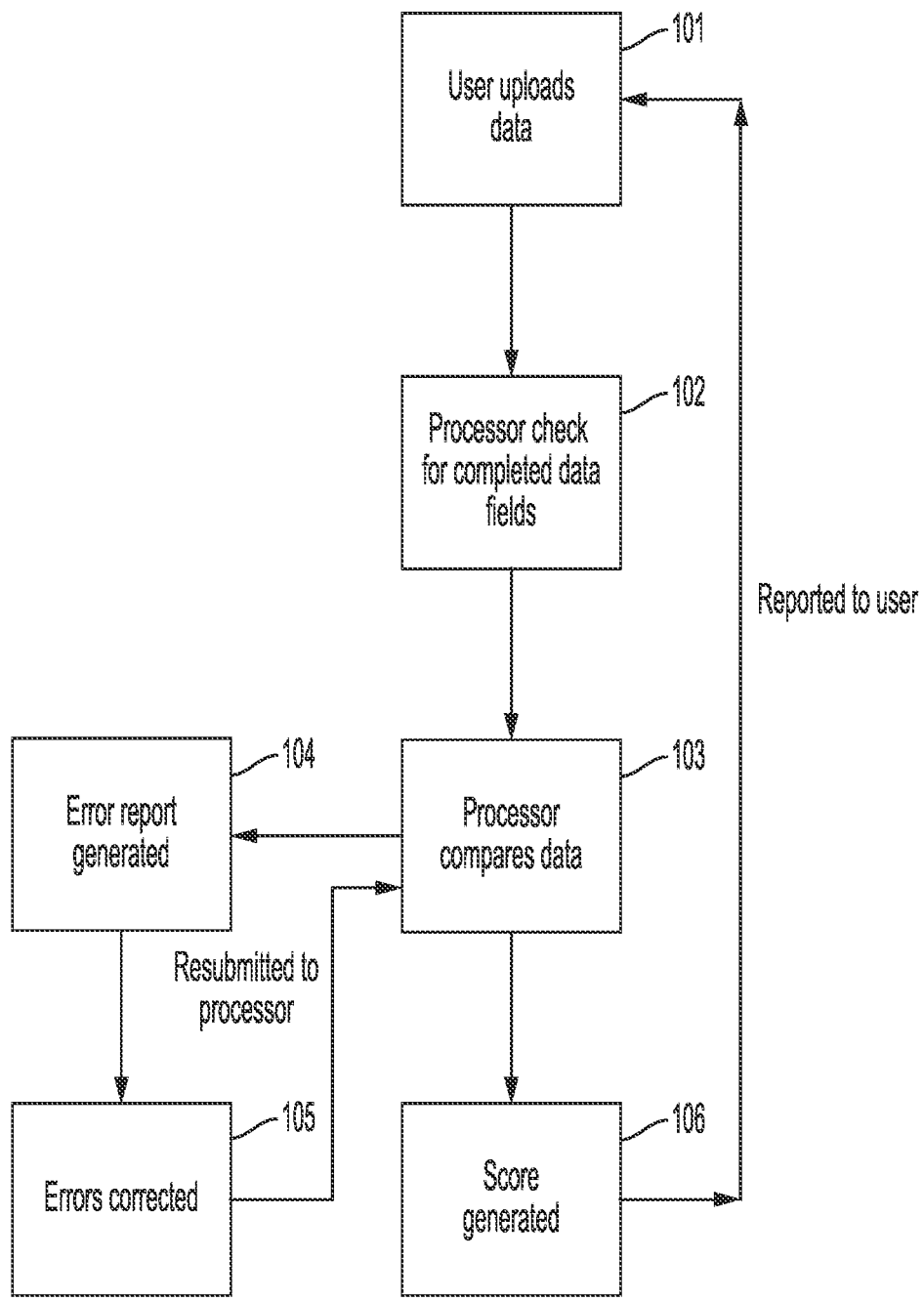
FIG. 1 is a block diagram depicting flow of information in the method of the present invention.

FIG. 1 shows the flow of information in the computer-based method of the present invention.

In the method of the present invention, metadata for a selected discipline is first uploaded to a computer processor. See step 101 of FIG. 1. The data can be uploaded in various manners. In one nonlimiting embodiment, the data is uploaded as an .xml file. In one nonlimiting embodiment, data is uploaded in a spreadsheet format such as via an EXCEL file.

In one nonlimiting embodiment of the present invention, the metadata uploaded, scored, corrected, and/or maintained, is for books. Book metadata, when encoded correctly helps book sellers, data providers, distributors, search engines and consumers find and access information about books. It also helps with inventory tracking, etc. This metadata includes, but is in no way limited to, book formats and prices, titles, publisher/imprint/brand name videos and other multimedia, descriptions and identifiers about the book. ONIX or online information exchange, an .XML-based standardized format for transmitting information electronically, is an example of a standard metadata format for the publishing industry. Accordingly, in one embodiment of the present invention, the computer-based method of the present invention may be designed to export .XML-based ONIX data uploaded by the user.

Figure 4:
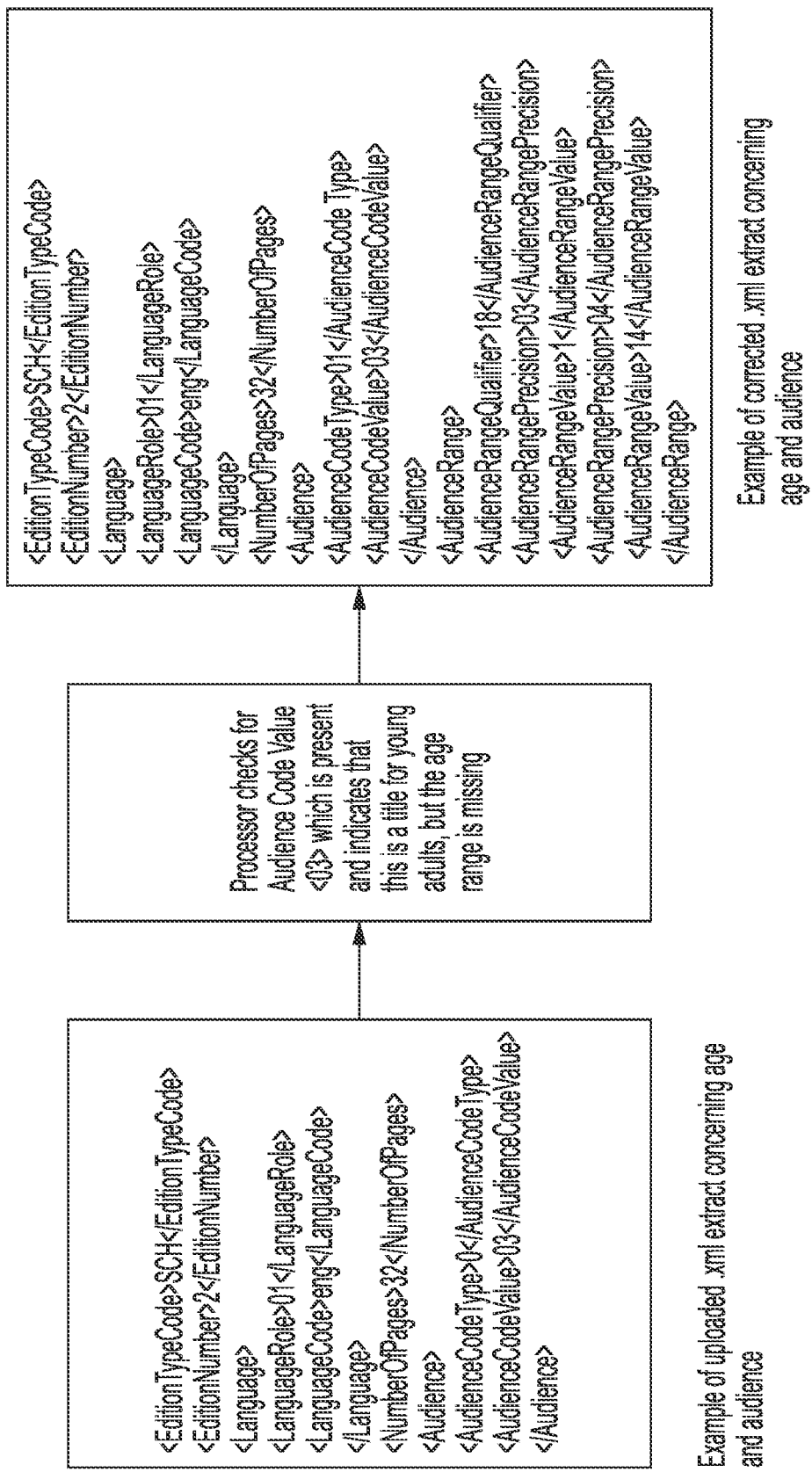
FIG. 4 provides an example of an .xml data file containing an error, its identification via the method of the present invention and the .xml data file following correction of the error.

As will be understood by the skilled artisan upon reading this disclosure, however, the computer method and scoring system described herein are routinely adaptable to other selected disciplines involving metadata, especially those schemas based upon an .xml standard. In the method of the present invention, the metadata file is first checked for completeness of the necessary data fields. For example, in an embodiment involving an .xml file, the .xml file is checked for completion of the tag, schemes, etc. See step 102 of FIG. 1. Also see FIG. 4 providing a nonlimiting example of an .xml data file containing an error, specifically missing data, its identification via the method of the present invention, and the .xml data file following correction of this error in accordance with step 102 of the present invention.

Figure 2B:
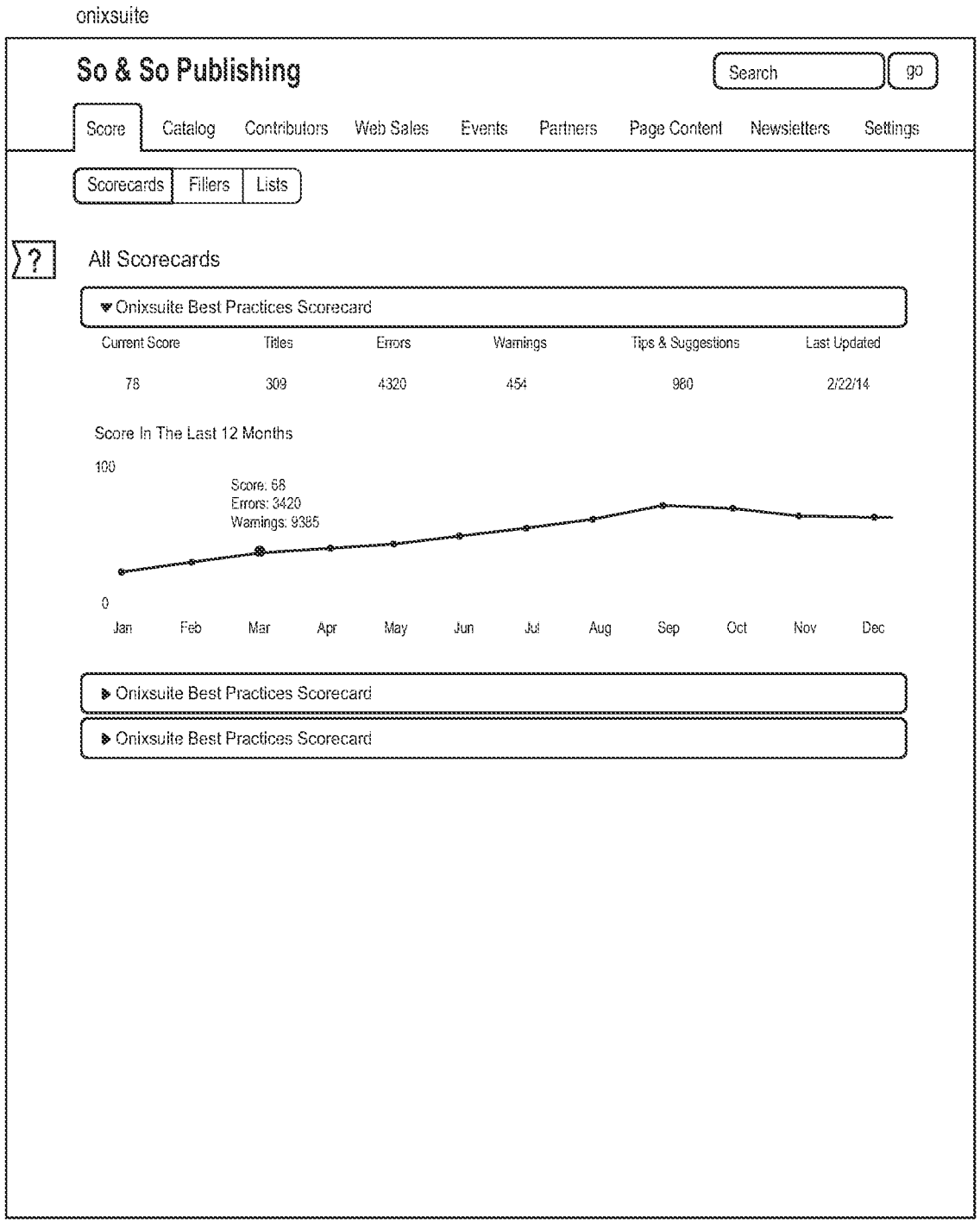
Figure 3A:
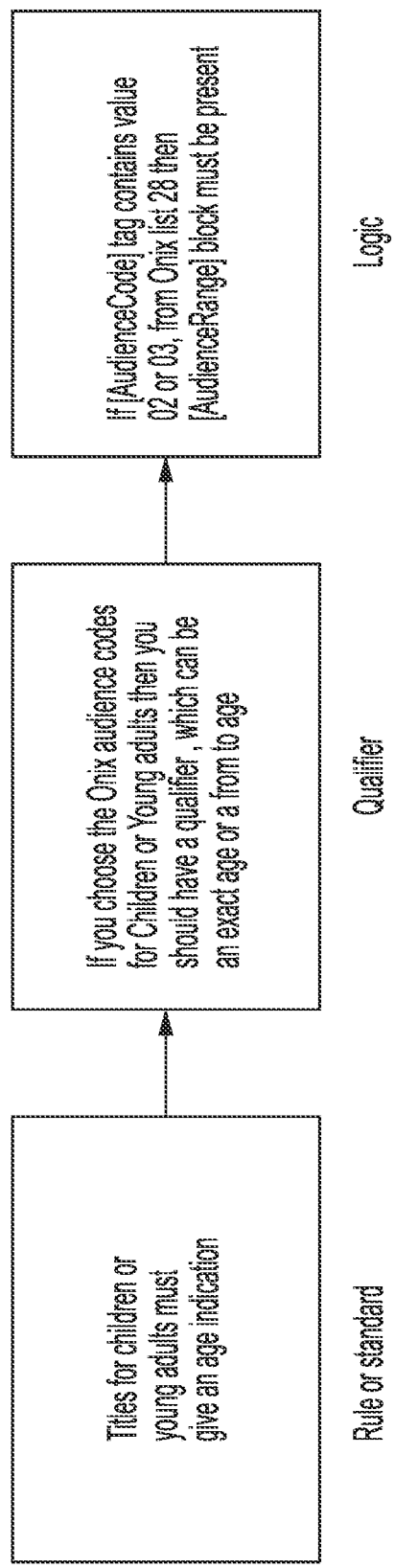
FIGS. 3A-3H provide nonlimiting examples of several industry standards or rules, the qualifier for the standard or rule, if required, and the logic for comparison of the metadata with the rule or standard.
Figure 3B:
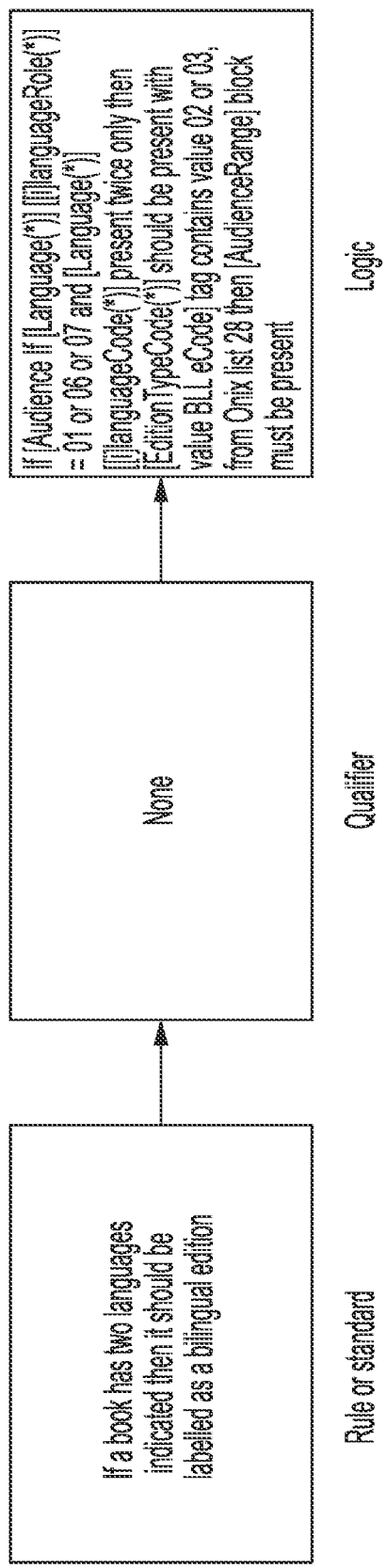
Figure 3C:
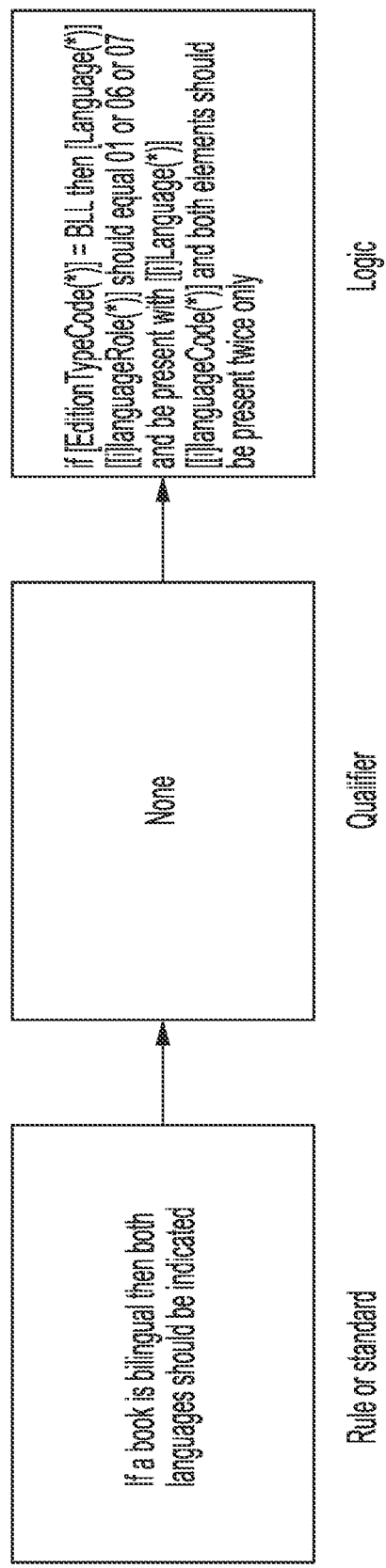
Figure 3D:
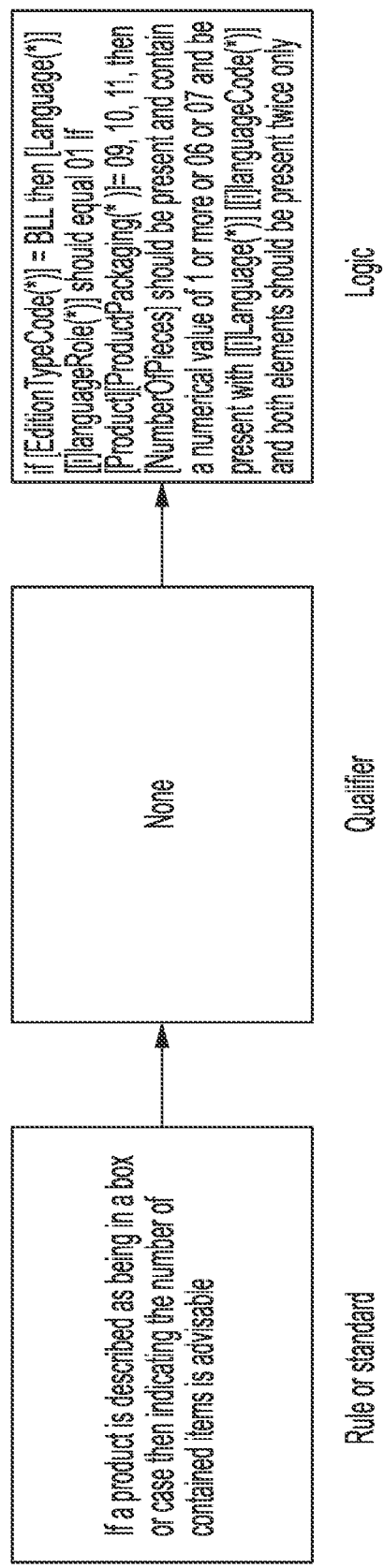
Figure 3E:
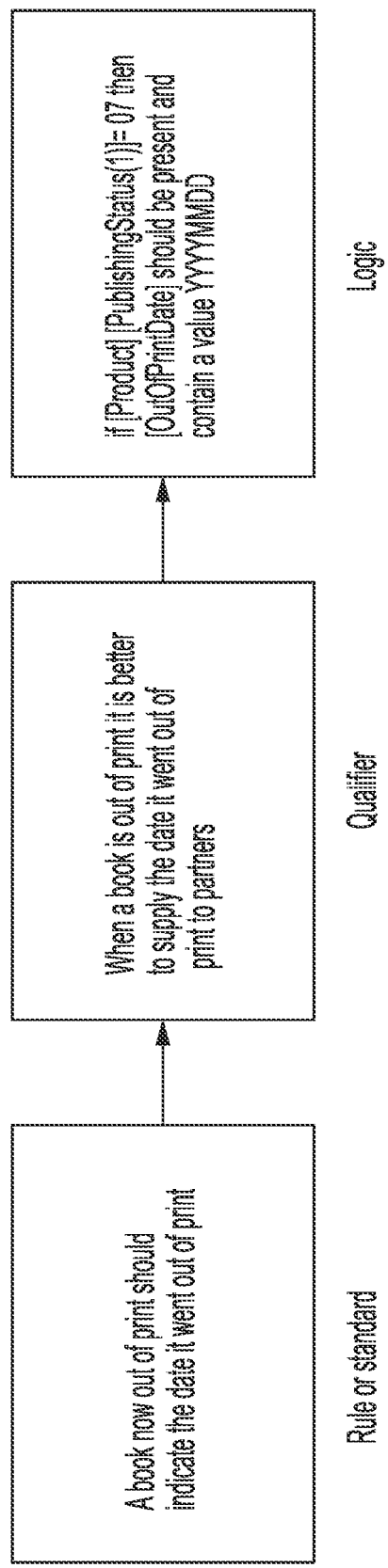
Figure 3F:
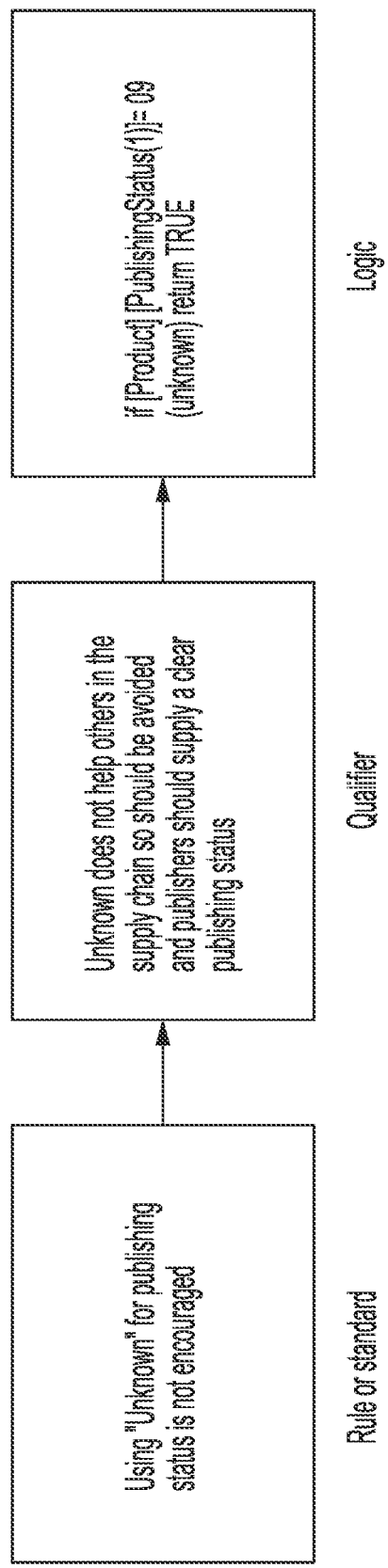
Figure 3G:
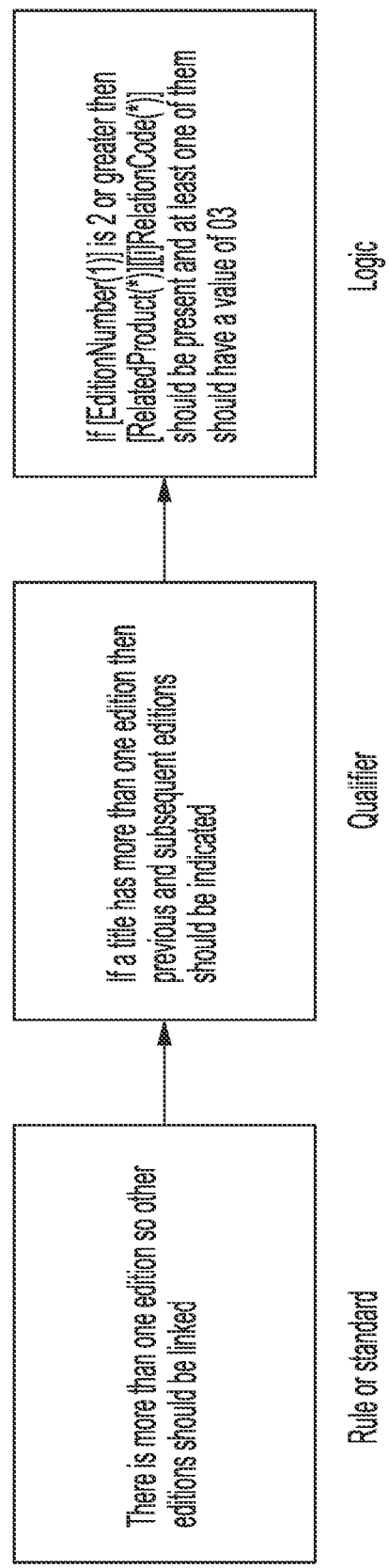
Figure 3H:
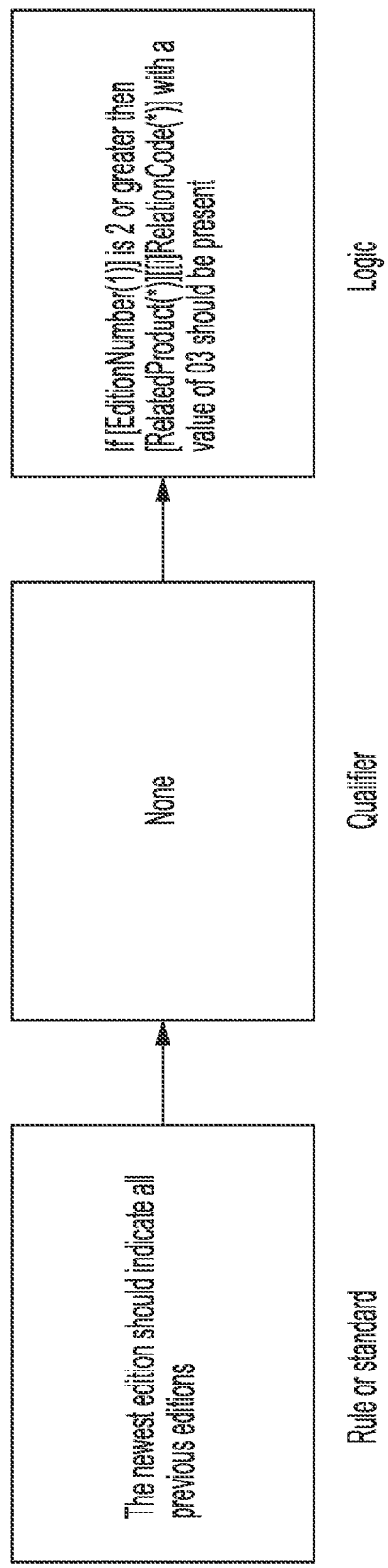

In the method of the present invention, the uploaded metadata is then further compared to one or more selected rules, standard and/or best practices for the selected discipline. See step 103 of FIG. 1. Rules, standards and/or best practices, for purposes of the present invention, may be from the consumer and/or from the industry and/or be a quality standard or assess quality metrics and/or be based upon recommendations, suggestions and/or proposals by the inventors. For example, for metadata relating to books, the metadata may be compared to one or more ONIX industry standards and/or one or more best practices including, but in no way limited to, those set forth by the Book Industry Group and/or Editeur.org and those recommendations, proposals and/or suggestions of the inventor's herein. In one nonlimiting embodiment, recommendations, proposals and/or suggestions of the inventor's herein may enhance metadata quality. In another nonlimiting embodiment recommendations, proposals and/or suggestions of the inventor's herein may enhance discoverability, searchability, saleability and/or profitability of items in the catalogue. In accordance with the method of the present invention, rules have been created by which the metadata is compared. These rules may comprise a single entity's best practices set forth by an industry standard setting body or selected sets of rules based on a combination of industry best practices, recommendations, suggestions and/or proposals as determined by the inventors and/or users. In one embodiment, the comparison may be based upon a set of rules developed by the inventors herein from analyzing other data sets. Rules are also written based on logic for the user. These rules not only check the .xml but within the .xml. For this step, the user may select the one or more consumer or industry rules or standards and/or best practices for which they want their metadata compared. The method may provide listings of consumer or industry rules or standards and/or best practices which the user may select from for comparison. Alternatively, or in addition, the user may select their own listing of standards, rules and/or best practices to which they compare their metadata. In one embodiment, the user may select rules to generate a particular scorecard, nonlimiting examples of which are depicted in FIG. 2A-2C. The user may select more than one listing for comparison and generate more than one error and/or warning list and more than one score for their metadata. In this step of the computer-based method of the present invention, errors are identified via algorithms written by the inventors for the present invention which, prior to the invention, required visual review by experts with years of experience in the rules, standards and best practices regarding metadata of the selected discipline. Such human review is both time-consuming and laborious as the rules, standards and best practices for metadata in a selected discipline are extensive and complex, differing between different countries and/or governing bodies and/or industries. In addition, the rules, standards, and best practices are frequently changing and new rules are being added to keep up with changes in technology and/or to improve discoverability, searchability, saleability and/or profitability of catalogue items within a given industry.

A nonlimiting example of an error identified at this step is the error of the Title being written in all capital letters and/or containing the words "volume 27" when there is a separate field for volume as part of ONIX. As another nonlimiting example, at this step, the error of a French-based publisher presenting a book title in any other format than capitalization of only the first word and proper nouns, or the error of a U.S. publisher presenting a book title in a format where only the first word is capitalized instead of in headline-case are identified. As another nonlimiting example, at this step, the error of having only an English language description on book that is sold is non-English speaking countries is identified. As another non-limiting example, if a user's digital rights to a book include all the countries of the world and the user is selling digital rights only based on the publisher's the home currency, this error is identified. Prior to the instant invention, such subtle, yet significant, errors could only be identified through visual inspection of randomly selected files by an expert in the metadata rules, standards and/or best practices for the selected discipline.

Nonlimiting examples of several industry standards or rules, the qualifier for the standard or rule, if required, and the logic for comparison of the metadata with the rule or standard are set forth in FIGS. 3A-3H. The method of the present invention comprises multiple similar algorithms for other standards and rules, as well as inventor recommendations, proposals and/or suggestions for use in the instant invention.

A breakdown of errors and warnings from the comparison is then generated and provided to the user. See step 104 of FIG. 1. By errors, it is meant problems that must be fixed for the file to be compliant with industry standards. By warnings, it is meant issues that may cause problems, or in fact be errors but must be checked to see whether a user wants to make an exception for them.

For example, for book metadata, the metadata may be scanned against all the rules for a selected scorecard, nonlimiting examples of which are depicted in FIGS. 2A-2C. The user then sees a list of results, listed by priority or type and/or data field. The user can then review the list of titles with this error or data resulting in a warning, and then they can apply a global or selected update or correction to all or selected titles which is immediately updated in the metadata. They can also review, correct and update an individual title after reviewing all that title's metadata with the errors and/or warnings highlighted. Thus, data errors and/or data resulting in a warning can be corrected automatically or on a case-by-case basis by user selection of the data errors and data resulting in warnings to be corrected.

Accordingly, the computer-based method also provides a means to correct and/or edit and/or enhance and/or improve and/or keep current the metadata. See step 105 of FIG. 1. Also see FIGS. 5A through 5E providing screen shots from the method of the present invention exemplifying the process of identifying and correcting an error in the metadata. Once a breakdown of errors and/or warnings is generated, the user may routinely navigate to an area that needs work, sorting, drilling down, to fix problems and investigate patterns. The method provides searching and sorting tools which provide the ability to locate and isolate issues within the metadata. The method further provides the ability to create metadata subsets to work on by browsing or searching, thus making it easy for the user to easily access the metadata that needs to be managed and/or corrected and/or improved or enhanced.

Further, the method provides a means to show potential problems to others, propose edits, and approve changes before committing them.

Using the method of the present invention, errors can be automatically located and recurring mistakes, errors and deficiencies in the data can be corrected, providing a means by which the entire database can be corrected and enhanced with speed and ease.

The corrected, edited and/or enhanced metadata can then be exported easily to trading partners via the method of the present invention.

In one embodiment, the method of the present invention further comprises assignment of one or more scores based upon the comparison of the metadata reported to the user in, for example a scorecard. See step 106 of FIG. 1. Various nonlimiting examples of scorecards are depicted in FIGS. 2A through 2C. Assigned scores may be based upon a number of factors including, but not limited to, the completeness and accuracy of the metadata, its compliance with industry standards, rules and/or best practices and/or inventor recommendations, suggestions and/or proposals and its richness, meaning the inclusion of additional metadata above and beyond what is required by the industry.

Another advantage of the present invention is that, at least for some users, this may be the first time that all of their metadata is maintained in one place where it can be referred to and referenced.

Also provided by the present invention is a scoring system for metadata. The score generated through the scoring system of the present invention provides a means by which the reliability and/or comprehensiveness of the metadata can be evaluated.

The system of the present invention comprises a computer processor for receiving metadata related to a selected discipline.

The system further comprises both a means for evaluating completeness of the metadata file, meaning that the required fields of the metadata file such as tag, schemes, etc. are completed, and a means for comparing the received metadata to one or more selected consumer or industry rules or standards and/or best practices for the selected discipline to identify errors previously only otherwise identified by visual review by experts with years of experience in the rules, standards and best practices regarding metadata of the selected discipline. One or more scores are then assigned based upon a number of factors including, but not limited to, the completeness and accuracy of the metadata, its compliance with industry standards, rules and/or best practices and its richness, meaning the inclusion of additional metadata above and beyond what is required by the industry. Nonlimiting examples of score cards are depicted in FIGS. 2A through 2C. Based upon the score or scores, the user can determine if correction and/or enhancement and/or improvement of the metadata is desired. Once data is corrected, enhanced and/or improved, the user may re-submit the metadata for comparison to receive a new score based upon the changes. Scores can be used internally as well as by trading partners of the metadata and other metadata recipients to evaluate the provider's products and information provided therein.

What is claimed is:

1. A computer-based method for managing metadata, the method comprising:
   receiving, by at least one processor, a metadata file including data populated into fields defined by a standard;
   assessing, by the at least one processor, the metadata file for completion of the fields defined by the standard;
   evaluating the metadata file against evaluation criteria, wherein the evaluation criteria is a collection of algorithms for evaluating the data for compliance with a plurality of rules of the standard, wherein the metadata file includes at least a first data in a first field and a second data in a second field, wherein the evaluation includes determining whether the second data complies with at least one of the plurality of rules, wherein the second data is dependent on the first data according to the evaluation criteria;
   presenting, by the at least one processor, a report of results of the evaluation in a graphical user interface;

presenting suggested improvements to the first data or the second data corresponding to one or more data errors in the report of the results of the evaluation in the graphical user interface;

receiving a selection of one or more data errors in the report of the results of the evaluation in the graphical user interface; and presenting a subset including at least one of the one or more data errors resulting from the selection of the one or more data errors.

2. The computer-based method for managing metadata of claim 1 further comprising:

calculating at least one score for the metadata file based upon the assessment of the completion of required fields, and the evaluation of the metadata against the evaluation criteria.

3. The computer-based method for managing metadata of claim 1, wherein the presenting the suggested improvements includes presenting, in the graphical user interface, the first data or the second data along with an explanation of the suggested improvement;

receiving, in the graphical user interface, an edit to the first data or the second data.

4. The computer-based method for managing metadata of claim 1, further comprising:

automatically making changes to the first data or the second data according to the suggested improvements.

5. A non-transitory computer readable medium comprising instructions stored thereon, the instructions effective to cause at least one processor to:

receive a metadata file including at least a first data in a first field and a second data in a second field, wherein the first field and the second field are defined by a standard;

assess the metadata file for completion of required fields, the fields defined by the standard;

evaluate the metadata file against evaluation criteria, wherein the evaluation criteria is a collection of algorithms for evaluating the data for compliance with a plurality of rules of the standard, wherein the evaluation includes a determination whether the second data complies with at least one of the plurality of rules dependent on the first data according to the evaluation criteria; and present, by the at least one processor a report of the results of the evaluation in a graphical user interface;

present suggested improvements to the first data or the second data corresponding to one or more data errors in the report of the results of the evaluation in the graphical user interface;

receive a selection of one or more data errors in the report of the results of the evaluation in the graphical user interface; and present a subset including at least one of the one or more data errors resulting from the selection of the one or more data errors.

6. The non-transitory computer readable medium of claim 5, wherein the evaluation of the metadata file further includes instructions to evaluate the metadata file against the plurality of rules, the metadata file includes the first field, the second field, and additional fields wherein each of the rules requires one of a particular data format in a field, or data defining particular information in one of the additional fields to be consistent with data in the another of the additional fields.

7. The non-transitory computer readable medium of claim 6, wherein the instructions are effective to cause the at least one processor to:

calculate at least one score based upon the evaluation, wherein the score includes a completeness component as judged by a percentage of fields that include data, and a quality component as judged by the evaluation of the metadata file against the evaluation criteria.

8. The non-transitory computer readable medium of claim 6, wherein the evaluation of the metadata file results in an identification of errors and warnings, wherein an error must be fixed to comply with the standard, and a warning is an optional suggestion.

9. The non-transitory computer readable medium of claim 8, wherein the instructions are effective to cause the at least one processor to:

automatically fix the metadata that resulted in at least some of the errors and warnings.

10. The non-transitory computer readable medium of claim 8, wherein the metadata file includes data pertaining to a publications.

11. The non-transitory computer readable medium of claim 8, wherein the evaluation criteria is selected from criteria associated with a first standard or a second standard.

12. The non-transitory computer readable medium of claim 8, wherein the presenting the suggested improvements includes instructions to present, in the graphical user interface, the first data or the second data along with an explanation of the suggested improvement; and receive, in the graphical user interface, an edit to the first data or the second data.

13. The non-transitory computer readable medium of claim 5, wherein the instructions are effective to cause the at least one processor to:

present suggested improvements to the first data or the second data in the graphical user interface.

14. A system comprising:

a non-transitory computer readable medium having instructions stored thereon; and at least one processor, the instructions effective to cause at least one processor to:

receive a metadata file including at least a first data in a first field and a second data in a second field, wherein the first field and the second field are defined by a standard;

assess the metadata file for completion of required fields, the required fields defined by the standard;

evaluate the metadata file against evaluation criteria, wherein the evaluation criteria is a collection of algorithms for evaluating the data for compliance with a plurality of rules of the standard, wherein the evaluation includes a determination whether the second data complies with at least one of the plurality of rules dependent on the first data according to the evaluation criteria; and present, by the at least one processor a report of results of the evaluation in a graphical user interface;

present suggested improvements to the first data or the second data corresponding to one or more data errors in the report of the results of the evaluation in the graphical user interface;

receiving a selection of one or more data errors in the report of the results of the evaluation in the graphical user interface; and presenting a subset including at least one of the one or more data errors resulting from the selection of the one or more data errors.

15. The system of claim 14, wherein the evaluation of the metadata file further includes instructions to evaluate the metadata file against the plurality of rules, the metadata file include the first field, the second field, and additional fields wherein each of the rules requires one of a particular data format in a field, or data defining particular information in one of the additional fields to be consistent with data in the another of the additional fields.

16. The system of claim 15, wherein the instructions are effective to cause the at least one processor to:
calculate at least one score based upon the evaluation, wherein the score includes a completeness component as judged by a percentage of required fields that include data, and a quality component as judged by the evaluation of the metadata file against the evaluation criteria.

17. The system of claim 15, wherein the evaluation of the metadata file results in an identification of errors and warnings, wherein an error must be fixed to comply with the standard, and a warning is an optional suggestion.

18. The system of claim 17, wherein the instructions are effective to cause the at least one processor to:
automatically fix the metadata that resulted in at least some of the errors and warnings.

19. The system of claim 17, wherein the evaluation criteria is selected from criteria associated with a first standard or a second standard.

20. The system of claim 17, wherein the presenting the suggested improvements includes instructions to present, in the graphical user interface, the first data or the second data along with an explanation of the suggested improvement; and
receive, in the graphical user interface, an edit to the first data or the second data.

21. The system of claim 14, wherein the instructions are effective to cause the at least one processor to:
present suggested improvements to the first data or the second data in the graphical user interface.

22. The computer-based method for managing metadata of claim 1, wherein the report of the results of the evaluation include an aggregation of errors by type, and showing number or records affected.

23. The computer-based method for managing metadata of claim 1, further comprising:
after the presenting the report of the results of the evaluation, receiving inputs to navigate, sort, or filter to identify a subset of the errors.

24. The computer-based method for managing metadata of claim 1, further comprising;
after the presenting the report of the results of the evaluation, and the receiving the selection of one or more data errors;
applying an update to correct a selected error.

25. The computer-based method for managing metadata of claim 24, wherein the applying the update to correct a selected error includes applying the update to a plurality of records having the error to correct the selected error across the plurality of records.

26. The computer-based method for managing metadata of claim 1, wherein the report of the results of the evaluation includes displays of groupings of errors and warnings.

* * * * *

UNITED STATES PATENT AND TRADEMARK OFFICE
CERTIFICATE OF CORRECTION

| | |
|---|---|
| PATENT NO. | : 11,593,326 B2 |
| APPLICATION NO. | : 14/048280 |
| DATED | : February 28, 2023 |
| INVENTOR(S) | : John Bantivoglio and Ashwani Kumar Singh |

It is certified that error appears in the above-identified patent and that said Letters Patent is hereby corrected as shown below:

On the Title Page

Item (12) delete "Bantivoglio" and insert -- Bantivoglio et al. --

Item (72) Inventor should read:
John Bantivoglio, III, Washington DC;
Ashwani Kumar Singh, Marlow, United Kingdom Signed and Sealed this
Twenty-third Day of May, 2023

Katherine Kelly Vidal
*Director of the United States Patent and Trademark Office*